Figure 1:
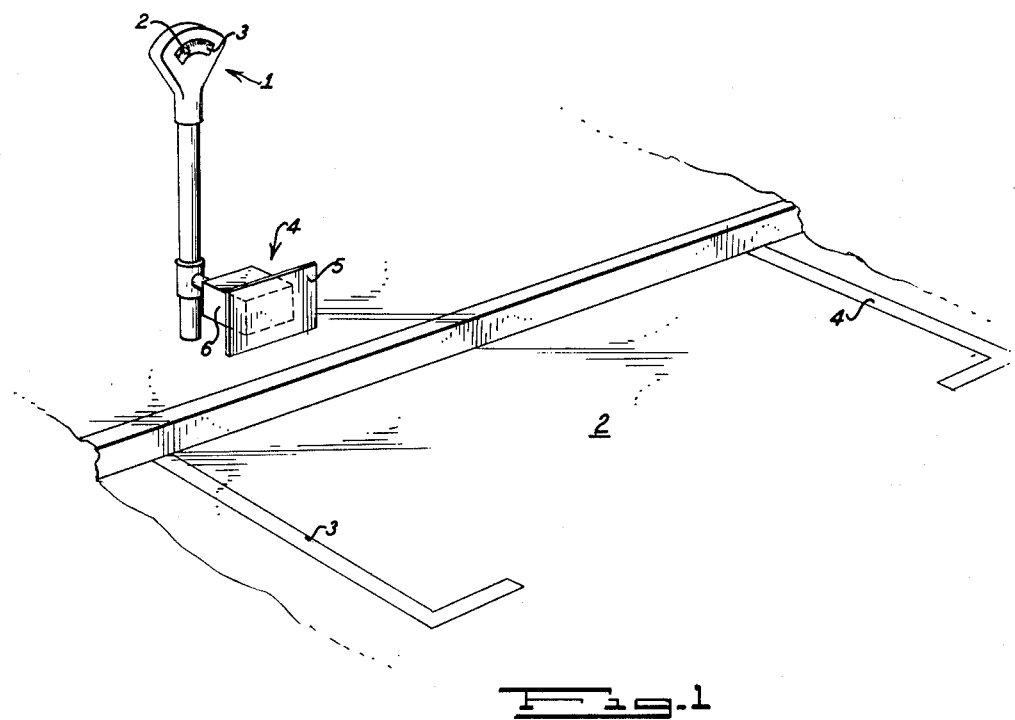

July 21, 1964  R. C. BAILEY ETAL  3,141,292

SELF-CANCELLING PARKING METER

Filed Nov. 7, 1961  4 Sheets-Sheet 1

INVENTORS
RALPH C. BAILEY
JOHN P. LOMENZO
SIDNEY J. SALZMAN

BY
ATTORNEYS

July 21, 1964  R. C. BAILEY ETAL  3,141,292
SELF-CANCELLING PARKING METER
Filed Nov. 7, 1961  4 Sheets-Sheet 2
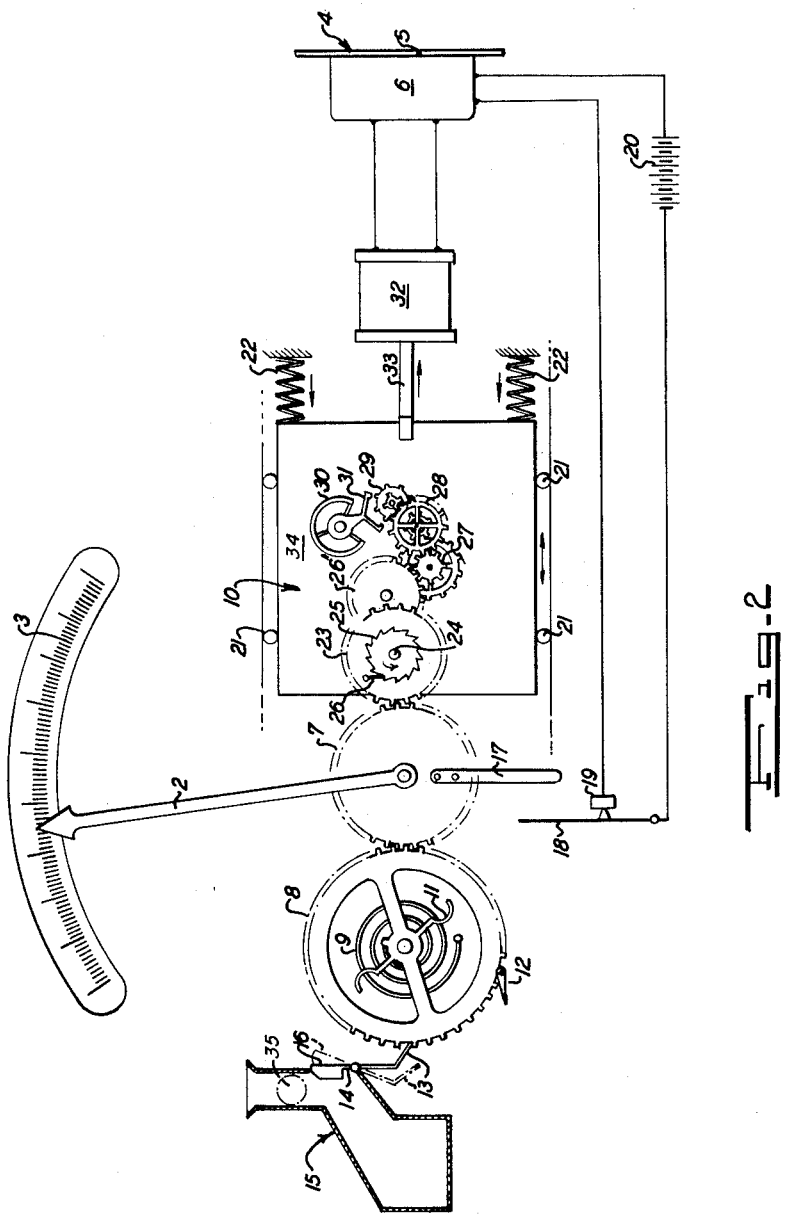
INVENTORS
RALPH C. BAILEY
JOHN P. LOMENZO
SIDNEY J. SALZMAN
BY Burgess Dinklage & Sprung
ATTORNEYS

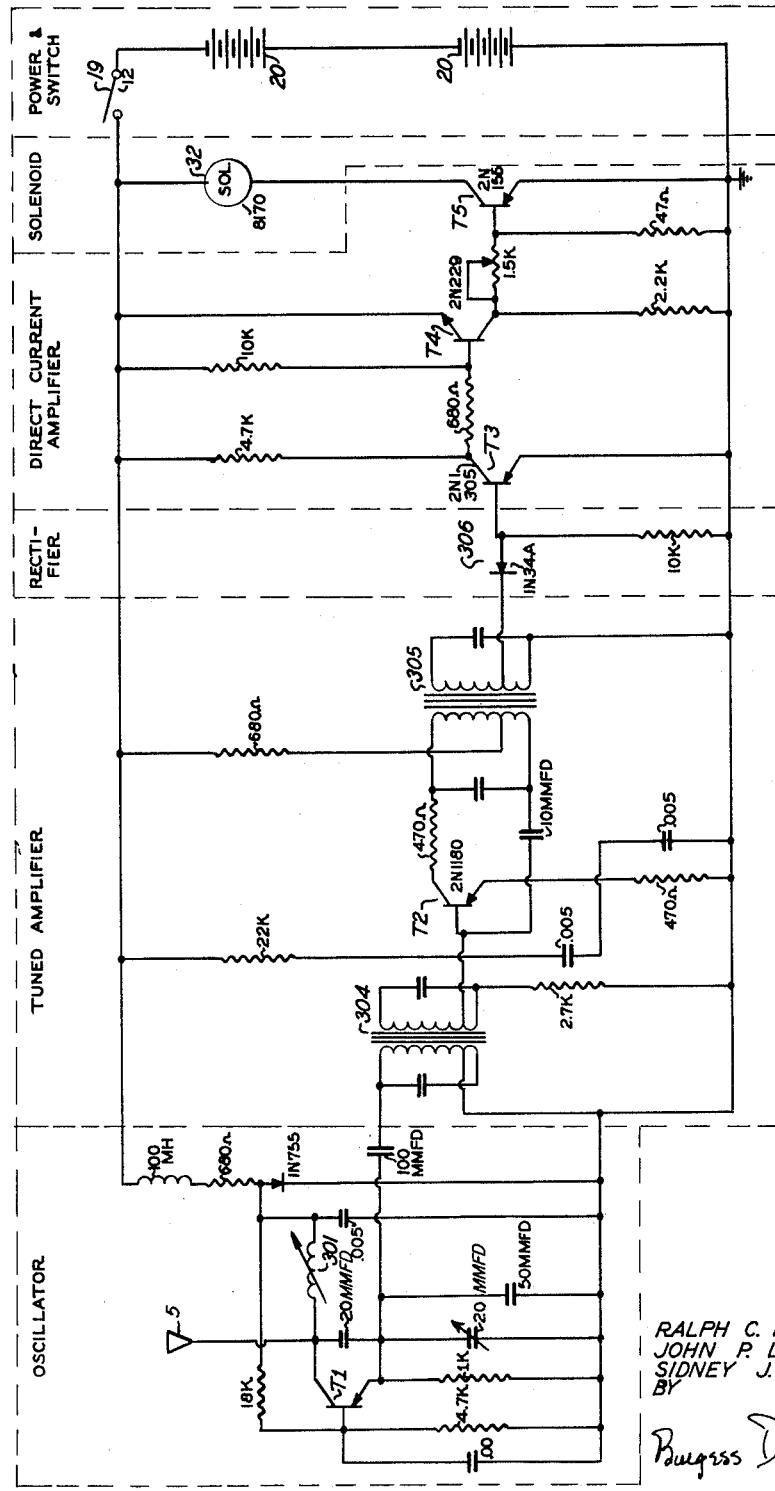

July 21, 1964 R. C. BAILEY ETAL 3,141,292
SELF-CANCELLING PARKING METER
Filed Nov. 7, 1961 4 Sheets-Sheet 4

INVENTORS
RALPH C. BAILEY
JOHN P. LOMENZO
SIDNEY J. SALZMAN
BY
ATTORNEYS 3,141,292
SELF-CANCELLING PARKING METER
Ralph C. Bailey, John P. Lomenzo, and Sidney J. Salzman, Rochester, N.Y., assignors to Bernz O Matic Corporation, a corporation of New York
Filed Nov. 7, 1961, Ser. No. 150,790
9 Claims. (Cl. 58—142)

This invention relates to a self-cancelling parking meter. The invention more particularly relates to a mechanism which will cause the indicator on a coin-operated parking meter to automatically return to its expired position in the absence of a vehicle at the area controlled by the meter and to a meter incorporating such mechanism.

In order to gain revenue and supervise available parking spaces for vehicles, it is common practice for the municipalities or the like to install and maintain coin-operated parking meters in order to control the individual available parking spaces. The meters are normally provided with some sort of indicator showing the amount of remaining permissible parking time for the vehicle at the area controlled by the meter and are usually provided with some type of indicator, as for example, a red flag to show that the available parking time has "expired." When a vehicle parks in an available spot controlled by a meter, the operator will insert a coin in order to actuate the meter, remove the expired indication and cause the indicator to show the amount of time available for the parking before the parking time thus purchased expires and the vehicle is subjected to be ticketed for a parking violation. The amount of parking time which may be purchased for a given coin, will, of course, depend on the given area, and the meter is quite often so constructed that different parking time rights can be purchased by the insertion of different values of coins. Thus, for example, a permissible parking time of 10 minutes may be purchased by the insertion of a penny; an hour's time by a nickel; 5 hours' time by a quarter.

In addition to the obvious expedient of providing revenue by renting the parking spaces which would normally have to be provided without charge, the parking meter allows a control of the parking situation and thus, for example, may prevent a given area from being undesirably tied up by all-day parkers.

Generally, the parker, who operates the meter will, for safety reasons, and in order to avoid the possibility of being ticketed actuate the meter to indicate a parking time somewhat longer than he estimates is needed. It is generally rare that the operator will leave the parking meter with his vehicle at precisely the moment at which the parking period for which he has paid has expired and more generally he will leave the meter with some unexpired time remaining thereon. It is common practice for another motorist to park and utilize this unexpired time without the necessity of depositing a further coin in the meter. This not only results in a loss of revenue which might otherwise be obtained but may, in certain instances, cause a traffic problem in that a motorist may cruise around to find a meter with unexpired time rather than parking at the first available spot or may even stand off and wait for a motorist to back out and leave a meter which still has time remaining thereon.

One object of this invention is a mechanism for a parking meter which will automatically cause or allow the meter's indicator to rapidly return to the expired position when a vehicle leaves the area controlled by that meter.

A further object of this invention is a parking meter which will automatically be tripped to its expired position in the absence of a vehicle in the area normally controlled by it.

A still further object of this invention is a mechanism including an electrical detector which will rapidly cause the indicator of a parking meter to return to its expired position when a vehicle parked in the area controlled thereby leaves even though the parking time indicated on the meter has not normally expired.

A still further object of this invention is such a mechanism which will still allow the meter to function in its normal manner if the mechanism or the power therefor fails.

A still further object of this invention is such a mechanism which may be easily and economically installed in existing meters and which is relatively trouble-free and maintenance-free and has low power requirements.

Figure 4:
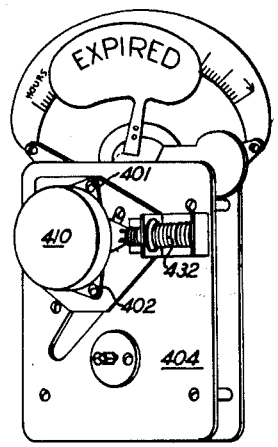
Figure 5:
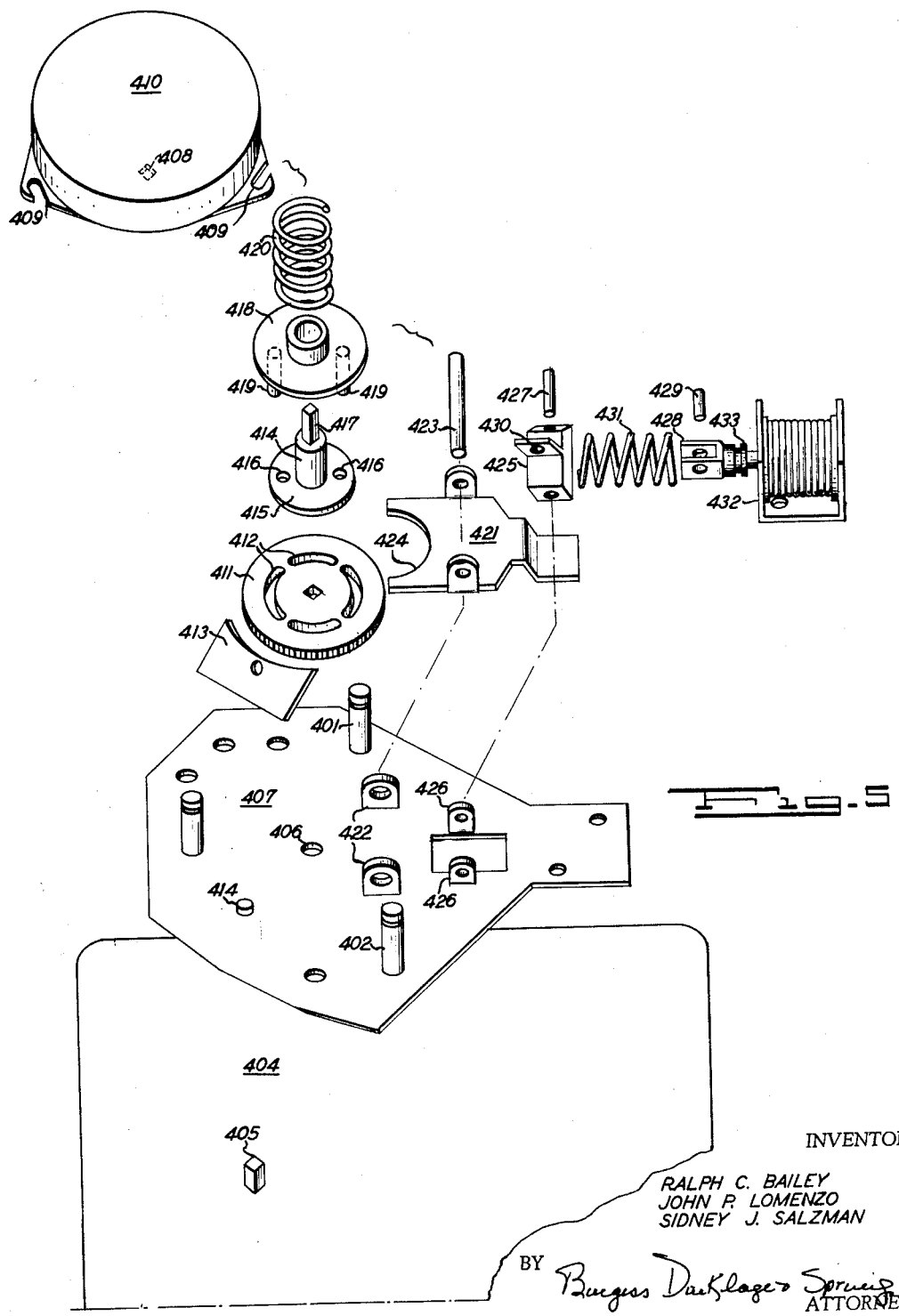

These and still further objects will become apparent from the following description read in conjunction with the drawings in which:

FIGURE 1 is a perspective view of the embodiment of a parking meter in accordance with the invention in its normal operational position controlling a parking area, FIGURE 2 is a diagrammatic drawing of an embodiment of a parking meter in accordance with the invention, FIGURE 3 is a circuit diagram showing an embodiment of a circuit arrangement of the device in accordance with the invention, FIGURE 4 is a perspective view of a conventional parking meter showing an embodiment of a mechanism in accordance with the invention installed thereon, and FIGURE 5 is an exploded perspective view of the clutch mechanism of the meter of FIGURE 4.

The parking meters which are presently commercially available and in use have a parking time indicator, as for example an ordinary pointer and a scale on which the pointer indicates the remaining parking time available. Drive means, generally a conventional clock spring, is provided for driving the indicator to its expired position and a clock-work mechanism controls the speed at which the drive means drives the indicator. When the indicator has reached its expired position, a red flag is generally shown on the meter with the words, "expired" or "violation."

In one type of meter a relatively large main spring of the clock type is provided which has to be wound up as a separate service procedure periodically. When a coin is inserted in the meter, a mechanism, driven by the spring, is automatically released which will drive the indicator arrow of the parking time indicator to a predetermined value on the scale determined by the size of the coin. The degree that the pointer is thus driven is generally determined by a pawl or finger which measures the size of the coin.

After the indicator arrow has been driven to its appropriate position on the scale in this manner, the main spring drive is automatically connected to drive the indicator toward its expired position and the speed of the drive is controlled by a conventional clock-work mechanism, as for example a conventional clock movement including an escapement and balance wheel. The clockwork mechanism so regulates the speed at which the main spring drives the indicator arrow that it will take the amounts of time indicated by the arrow on the scale for the arrow to reach its expired position. When the arrow reaches this expired position, an indicator, as for example in the form of a red flag, is released and shows on the meter face. This flag may, for example, be marked with the words, "expired" or "violation."

Other types of meters are known in which the insertion of a coin merely releases a lock mechanism and allows the meter to be wound by hand, as for example, through an appropriate lever provided. The size of the coin may limit the degree of winding permissible by the actuation of the hand lever, and upon winding, the main spring is wound and the indicator moved to the appropriate position, on the scale, from which it may be driven down by the wound spring to its expired position. The speed of drive is again controlled by a clock-work mechanism. When the expired position for the indicator is reached, a red flag indicating "violation" or "expired" may also automatically be actuated to appear in the meter face.

The invention is applicable for use in combination with any known or conventional parking meter, as for example of the above-mentioned types having a parking-time indicator and drive means for driving this indicator to its expired position with a clock-work mechanism for controlling the speed at which the drive mechanism so drives the indicator.

In accordance with the invention, electrical detection means are provided for detecting the absence of a vehicle in the parking area controlled by the meter and further means are provided actuated by the electrical detection means for disengaging the clock-work mechanism when the detection means responds to an absence of a vehicle in the parking area controlled by the meter whereby the drive means will rapidly drive the indicator to its expired position. In accordance with the preferred embodiment of the invention, the electrical detection means includes a circuit functionally disrupted by the presence of a vehicle in the parking area controlled by the meter and the means for disengaging the clock-work mechanism include a solenoid as for example operating a clutch member for disengaging the clock-work mechanism when the solenoid is energized. The clock-work mechanism is preferably automatically engaged, as for example by spring means when the solenoid is deenergized and an electric power source, as for example a battery, is provided for the solenoid and the circuit. Furthermore, a switch may be provided which automatically disconnected the source of power when the indicator is in the expired position.

Referring to the embodiments shown in the drawing, in FIG. 1, 1 represents a parking meter controlling the parking area 2 defined by the painted white lines 3 and 4. The meter is provided with a parking-time indicator, including the pointer 2 and scale 3. An electric detector 4 which will be more fully described hereinafter is provided. The detector is electrically operated and will respond to the absence of a vehicle in the parking area 2. The detector includes the antenna plate 5 and the control box 6 incorporating the electrical components and power source.

The parking meter 2 may basically be of any well-known or conventional construction provided with a parking-time indicator and drive means for driving the indicator to its expired position, and a clock-work mechanism for controlling the speed at which the drive means drives the indicator.

The meter is diagrammatically shown on a greatly simplified scale in FIGURE 2 in order to facilitate understanding. As shown the meter has a parking-time indicator consisting of the scale 3 and pointer 2 which is driven through the gears 7 and 8 by means of the main spring 9. The main spring 9 when wound will tend to drive the pointer 2 to its expired position in a clockwise direction. The speed of drive is controlled by the clock-work mechanism of conventional construction designated as 10. Connected to the gear 8 is the winding handle 11 and the finger 12. A ratchet-type lock 13 engages the teeth of the gear 8 and prevents the same from being wound in a clockwise direction, though the pawl will allow the gear to move in a counter-clockwise direction as the main spring 9 unwinds. The pawl 13 is pivoted on the end of the lever arm 14 of the coin actuating mechanism 15 so that as a coin is inserted into the mechanism it will act on the cam 16 pivoting the pawl 13 out of engagement with the teeth of the gear 8. The finger 12 is so constructed that when the same contacts the pawl 13, it will pivot the lever 14 forcing the pawl 13 back into engagement with the teeth of the gear 9.

A finger 17 is connected to the gear 7. When the indicator 2 is in its expired position, the finger 17 will press the leaf spring 18 of the electrical contact switch 19 forcing the switch open and disconnecting the battery 20 (which though normally positioned in the box 6 is diagrammatically shown outside of this box for purposes of illustration). The clock-work mechanism 10 is mounted as a unit on the plate 34 which is, in turn, movably supported on the rollers 21 for movement back and forth toward and away from the gear 7. The springs 22 normally resiliently urge the plate 34 toward the gear 7 so that the gear 23 of the clock-work mechanism will be engaged with the gear 7 and the clock-work mechanism will govern the speed at which the pointer 2 can move in a clockwise direction.

The gear 23 is freely rotatably mounted on the shaft 24. Connected to the shaft 24 is a ratchet gear 25 which is engaged by the pawl 26 on the gear 23. Due to this arrangement, the shaft 24 must rotate with the gear 23 in a counter-clockwise direction but the gear 23 may turn freely in a clockwise direction without actuating the rest of the clock-work mechanism. Also mounted on the shaft 24 is a smaller gear (not shown) which engages with the gear 26 which through the gear train 27, 28 drives the escapement wheel 29. The escapement wheel 29 is controlled in the conventional manner by the balance wheel 30 and escapement lever or pallets 31. A solenoid 32 is connected to the plate 34 by means of the arm 33 so that when the solenoid 32 is energized, the plate 34 will be moved away from the gear 7 against the pressure of the springs 22 disengaging the gear 23 from the gear 7 and thus disengaging the clock-work mechanism. The energization of the solenoid 32 by the battery 20 is controlled through an electric detection circuit which responds to the absence of a vehicle in the parking area 2. When the detection circuit which is also energized by the battery 20 so responds, power from the battery 20 is supplied to energize the solenoid 32. The electrical detection circuit may be any known or conventional circuit as is used to detect the presence of an object as for example, for the type conventionally found in mine detectors, etc. This circuit may, for example, operate on an electrostatic principle wherein an electrostatic field is altered by the presence of a vehicle in the parking area 2 or may act on an induction principle.

Preferably the electrical detection means includes a circuit or several circuits which are functionally disrupted by the presence of a vehicle in the parking area. In this manner the solenoid 32 is only energized when the circuits are normally operating and when there is no vehicle present in the area 2. This provides a fail-safe feature in that any malfunctioning of the circuit or breakdown or loss or failure of power will merely result in the meter's operating in its normal manner without the self-cancelling feature.

An embodiment of a detection circuit and circuit for actuating the solenoid 32, as shown in FIGURE 3. The circuit as shown constitutes a transistorized electronic package of the capacity change detector type which may sense the presence or absence of a body which absorbs radio-frequency energy.

Basically, the circuit may be functionally divided into four basic components, i.e. an oscillator, which feeds into a tuned amplifier which, in turn, feeds through a rectifier to a direct current amplifier supplying power for the solenoid 32.

The power source for the circuit consists of the 12 volt, dry cell battery 20 though any other known or conventional power source may be provided, as for example conventional line voltage when available, acting, for example, through a transformer. The oscillator portion of the circuit, as boxed off and labeled in FIG. 3 has the transistor T1 and the variable impedance coil 301.

The antenna 5 is attached to the collector of the transistor T1, and the oscillator will generate a radio frequency when powered from the source 20 by the closing of the switch 19. The oscillator may be tuned to a pre-determined frequency by adjusting the coil 301. This frequency is matched to that of the tuned amplifier where there is a normal capacity between the antenna 5 and ground, i.e. when there is no body in the presence of the antenna 5 which will absorb radio frequency energy.

The nature of the oscillator circuit shown is such that the frequency generated by the oscillator will shift if the capacity between the antenna and ground is changed as, for example, by the presence of a body, such as a vehicle, which will absorb radio frequency energy.

The radio frequency developed by the oscillator feeds in to the tuned amplifier portion of the circuit through the transformer 304. The portion of the circuit is marked off and labeled in FIG. 3 and is provided with the transistor T2 and will only pass a predetermined radio frequency which it will amplify. The tuned amplifier is set so that it will only pass and amplify radio frequency generated by the oscillator in the absence of a body which will absorb radio frequency energy in the vicinity of the antenna 5, i.e. the frequency generated when there is normal, undisturbed capacitance between the antenna 5 and ground.

The amplified tuned signal is passed from the tuned amplifier through the transformer 305 to the diode rectifier 306 which changes the radio frequency energy generated by the oscillator and tuned and amplified by the tuned amplifier into direct current voltage which is fed into the direct current amplifier portion of the circuit provided with the transistors T3, T4, and T5. The direct current amplifier takes the low voltage output of the rectifier and converts it to a high current output sufficient to energize the solenoid 32.

When a vehicle is parked in the parking area controlled by the meter, and the switch 19 is closed, the presence of the vehicle will change the normal capacitance between the antenna 5 and ground so that the normal radio frequency generated by the oscillator is shifted and will not pass through the tuned amplifier and rectifier to the direct current amplifier so that the solenoid 32 will not be energized and the parking meter will operate in its normal manner. The presence of the vehicle in the parking area controlled by the meter thus functionally disrupts the operation of the circuit as described.

If, however, the vehicle leaves the parking area before the time on the meter has expired, so that the switch 19 is still closed, the capacitance between the antenna 5 and ground will return to its normal value so that the oscillator will oscillate the radio frequency to which the tuned amplifier is tuned, this tuned signal will be amplified, rectified to direct current, and again amplified to energize the solenoid 32 which will disengage the clock-work mechanism from the meter causing the meter to rapidly return to its expired position, shutting off the power by opening the switch 19.

As the solenoid 32 is only energized when the circuit as disclosed is normally functionally operative, any failure of power or breakdown of the circuit will merely result in a failure of the solenoid 32 to become energized so that the meter will function in its conventional manner without the self-cancelling feature.

In place of the oscillator circuit as shown, two oscillators may be provided which feed a matched or resonance output to the amplifier. One of these oscillators may be provided with the antenna 5 so that the presence of a vehicle will shift its frequency response and the output of the two oscillators will no longer be mated so that the following amplifier cannot pass the tuned signal.

In operation, assuming the indicator 23 to be at its expired position, the finger 17 presses against the leaf spring 18 opening the switch 19 and thus disconnecting the power source 20 from the circuit and solenoid, the meter and the detection device therefor are completely shut off. The springs 22 urge the plate 34 toward the gear 7 so that the gears 7 and 23 engage.

When a vehicle pulls up into the area 2 and the operator deposits a coin 35 into the coin mechanism 15, the action of the coin on the cam 16 causes the lever 14 to pivot so that the pawl 13 is disengaged from the gear 8. The operator may then wind the meter by turning the handle 11 in a clockwise direction. This winds the main spring 9 and causes the finger 12 to engage the pawl 13 pivoting the lever 14 so that pawl 13 again engages the gear 8 and further limits the degree of winding permissible. With the pawl 13 engaged with the teeth in gear 8, the gear may move in a counter-clockwise direction but cannot be turned again in a clockwise direction unless another coin is inserted. A red flag (not shown) may be provided which is automatically put in front of the scale 3 when the pointer 2 is in its expired position and is not again released until the handle 11 is fully wound so that the member 12 engages the pawl 13. This will prevent the gear 8 from being partially wound. Upon the winding of the handle 11 in the clockwise direction, the gear 7 which meshes with the gear 8 is rotated in a counter-clockwise direction moving the pointer 2 up on the scale 3. Assuming, for example, that the scale 3 has a maximum value of one hour, and that the meter is a single coin meter, allowing for example one hour's time for a five-cent piece, the winding would bring the pointer to the 1 hour position at the extreme left-hand side of the scale 3.

As the gear 7 rotates in the counter-clockwise direction, the finger 17 releases the leaf spring 18 so that the contact switch 19 is closed and the transistorized circuit, as shown in FIG. 3, is energized. Due to the presence of the vehicle as detected by the antenna 5 and coupled into the circuit to unbalance the same, the circuit does not normally functionally operate; the power requirements are extremely low, and the solenoid 32 will not be energized so that the springs 22 will continue to urge the plate 20 so that the gear 23 engages the gear 7.

As the handle 11 is turned in the clockwise direction to wind the meter, and the gear 7 turns in a counter-clockwise direction, the gear 23 in turn is rotated in a clockwise direction. Due to the pawl and ratchet arrangement 25 and 26, however, the gear 23 will merely freely rotate on the shaft 24.

With the meter in its fully wound position, the main spring 9 acting on gears 8 and 7 will tend to force pointer 2 to its expired or 0 position. The speed of this drive, however, is controlled by the clock-work mechanism in that the gear 7 can only rotate as fast as the gear 23 will allow it and the speed gear 23 which must rotate with its shaft in the counter-clockwise direction is precisely controlled by means of the escapement mechanism-balance wheel 29, 30, and 31, acting through the gear train 28, 27, 26. The clock-work mechanism is so arranged that it takes the main spring an hour to drive the pointer 2 from its full one-hour position to the expired position.

If the vehicle remains in parking area 2 for the full hour, the pointer 2 will merely run to the expired position and show a red flag if provided and shut off the detector. At any time prior to the expiration of the time indicated on the scale 2 a further coin may be inserted in the device 15 and the device wound by the handle 11 to the one-hour position.

If, however, prior to the expiration of the hour's parking time, the vehicle leaves the area 2, the vehicle will no longer be statically coupled with the antenna 5 and the transistorized circuit as shown in FIG. 3 can normally functionally operate causing the solenoid 32 to be energized by the battery 20 as previously described. Upon energization of the solenoid 32, the plate 10 is moved away from the gear 7 so that the gear 23 is disengaged from the gear 7 and the gear 7 is no longer retarded by the clock-work mechanism so that the main spring 9 and gear 8 will rapidly and immediately drive it to its expired position. At this position, of course, the finger 17 will open the switch 19 shutting off current. If a coin is inserted into the device and the meter attempted to be operated when there is no vehicle in the area 2, upon the turning of the handle 11 and movement of the gear 7, the switch 19 will close and the circuit shown in FIGURE 3 will be normally functionally operative energizing solenoid 32 so that the meter will immediately return to the expired position. This will also occur if the vehicle is not parked closely enough to the antenna 5. The area influence of the antenna 5 can be controlled, and this may be used as an extra advantage to discourage motorists from parking too far from the curb as the device will only operate if the vehicle is correctly parked in the parking area 8 so as to influence the antenna 5.

The power requirements for the device are extremely low and conventional 12 volt lattern batteries generally ordinarily available in municipalities for emergency lanterns or the like may be used. The life-time is relatively long as the power is completely shut off when the meter is inoperative and operates with an extremely low power requirement except for the brief instant that the indicator is not in its expired position, and there is no vehicle in the parking area.

In place of the circuit shown in FIGURE 3, there may, for example, be used two oscillating circuits which will allow current feed through a detection device for ultimate actuation of the solenoid when so balanced. One of the circuits may be provided with an antenna which becomes electromagnetically coupled with a vehicle so that the two circuits become unbalanced in the presence of a vehicle in the parking area and thus will not normally functionally operate and the solenoids will not be energized.

The invention is particularly adaptable for the modification of conventional parking meters in an extremely efficient, economical, and reliable manner.

FIGURE 4 shows a perspective view of a conventional parking meter with the casing removed modified in accordance with the invention. In conventional meters, the clock-work mechanism may be provided as a separately removable unit, such as the unit 410 of FIG. 4, provided in its own casing such as a metal and plastic casing. The unit may be simply attached and removed from the meter for repair, replacement, or the like by being clipped to the three holding posts 401, 402 and 403. The mechanism from the meter is engaged with the clock-work mechanism by means of a square shaft which extends through the back-plate of the meter 404 and into corresponding square socket in the timing mechanism. The timing mechanism may thus be slid on and off the shaft but when slid on in position, it is in rotational engagement with the shaft. The timing mechanism in size and dimension is not unlike an ordinary pocket watch.

In accordance with the invention the conventional mounting posts are removed and a unit involving new mounting posts, the solenoid and a clutch mechanism are installed. As shown, the unit is mounted on a plate 407 which is secured to the back plate assembly 404 of the conventional parking meter as, for example, the parking meter marketed under the designation "Park-O-Meter" by Mage Hale Park-O-Meter Company, Oklahoma City, Oklahoma. The plate 407 is provided with the hole 406 for the square drive shaft 405 of the parking meter which normally extends into the square drive socket 408 of the clock-work mechanism 410. The plate 407 is provided with the three mounting posts 401, 402 and 403 on to which the clock-work mechanism 410 may clip by means of the clips 409 in the conventional manner. Mounted on the square drive shaft 405 is the ratchet wheel 411 provided with the slots 412. The ratchet wheel 411 is thus secured to rotate with the square drive shaft 405. A pawl 413 is mounted on the pin 414 so that the same may swing and engage the teeth of the ratchet wheel 411 intermittently retarding the rotation of the ratchet wheel when the clock-work mechanism 410 is disengaged as hereinafter described, and thus acting as a governor to prevent too violent a return of the meter to the expired position upon disengaging the clock-work mechanism.

A unit consisting of the drive shaft 414 provided with the plate 415, having the holes 416 and the square drive shaft 417 is inserted through the clutch plate 418 and clutch spring 420 into the clock-work mechanism so that the square shaft 417 engages in the drive socket 408 of the clock-work mechanism. The clutch plate 418 is provided with the pins 419 which extend through the holes 416 of the drive shaft and may engage into the slots 412 of the ratchet wheel 411. A clutch throw-out fork 421 is pivotally mounted on the plate 407 by means of the pivot brackets 422 and pivot pin 423.

The cut-out 424 of the clutch throw-out fork engages around the plate 415 and the throw-out will press the clutch plate 418 when pivoted in a direction toward the clock-work mechanism 410. A trip dog 425 is pivotally mounted on the plate 407 by means of the bearing blocks 426 and pin 427. The trip dog is so dimensioned that when the same is pivoted, its lower edge will press against the cultch throw out fork causing the same to pivot. The solenoid 432 is also mounted on plate 407 and the solenoid plunger arm 433 is connected to the trip dog by means of the yoke 428 and pin 429 which engages in the hole 430 of the trip dog. A spring 431 causes extension of the solenoid plunger 33 when the solenoid is deenergized.

With the unit operationally positioned on the meter, and the solenoid 432 deenergized, the spring 420 will press the clutch plate 418 in a direction away from the clockwork mechanism 410 so that the pins 419 will extend through the holes 416 and engage the slots 412 in the ratchet wheel 411. The clock-work mechanism will thus be normally operationally connected to the meter. When, however, the solenoid 432 is energized in the manner previously described, the plunger 433 will retract into the solenoid body compressing the spring 431 and pivoting the trip dog 425. The pivoting of the trip dog 425 will, in turn, cause a pivoting of the clutch throw out fork 421 about the pin 423 and will move the drive shaft 414 and clutch plate 418 toward the clock-work mechanism 410 compressing the spring 420. This will cause the pins 419 to be lifted out from the slots 412 so that the ratchet wheel 411 and the drive shaft 405 connected thereto are free and disengaged from the clock-work mechanism of the meter through the drive of its own main spring and rapidly return to the expired position. As soon as the solenoid 432 is deenergized, the spring 431 will cause the trip dog to pivot to its normal position and the spring 420 will cause the clutch mechanism to again engage causing the pins 419 to be in engagement with the slots 412 in the ratchet wheel 411.

The detection mechanism for energizing the solenoid 32 may be as previously described and the arrangement as shown in FIGS. 4 and 5 allow a convenient and economical conversion of existing meters while retaining a maximal number of the conventional meter parts and requiring a minimum amount of new parts which fit in the conventional meter casing, and which may very easily and economically be installed on existing meters.

While the invention has been described in detail, with reference to certain specific embodiments, various changes and modifications which fall within the spirit of the invention and scope of the appended claims will become apparent to the skilled artisan. The invention is, therefore, only intended to be limited by the appended claims or their equivalents wherein we have endeavored to claim all inherent novelty.

We claim:

1. In a parking meter arrangement having a parking time indicator with an expired position, drive means for driving said indicator to said expired position, a clock-work mechanism for controlling the speed at which said drive means drives said indicator, and electrical detection means for zeroing the meter to its expired position in the absence of a vehicle in the parking area controlled by the meter, the improvement which comprises means, including a solenoid, for disengaging said clockwork mechanism when said solenoid is energized, said detection means comprising a circuit containing an antenna and tuned to the normal capacitance between the antenna and ground and detuned by capacitance between said antenna and a vehicle in the parking area controlled by the meter, and means for energizing said solenoid when said circuit is tuned.

2. Improvement according to claim 1 including electric power means for said detection means and solenoid and switch means for disconnecting said power means when said indicator is at its expired position.

3. Improvement according to claim 1 in which said means for disengaging said clock-work mechanism includes clutch means actuated by said solenoid.

4. Improvement according to claim 3 in which said clutch means comprises a spring-loaded clutch plate and a pivotally mounted clutch-throw-out fork connected for actuation by said solenoid.

5. Improvement according to claim 1 in which said drive means comprises a clock-spring.

6. In a coin-operated parking meter arrangement having a parking time indicator with an expired position, drive means operatively connected to drive said indicator to said expired position, a clock-work mechanism for controlling the speed at which said drive means drives said indicator, and electrical detection means for zeroing the parking time indicator to its expired position in the absence of a vehicle in the parking area controlled by the meter, the improvement which comprises means including a solenoid for disengaging said clock-work mechanism from said drive means when said solenoid is energized, means for engaging said clock-work mechanism with said drive means when said solenoid is deenergized, said electrical detection means including a circuit containing an antenna and tuned to the normal capacitance between the antenna and ground and detuned by the capacitance between said antenna and a vehicle in the parking area controlled by the meter, electric power means for said solenoid and circuit, said circuit being functionally operative when tuned to connect said electrical power means and said solenoid for energizing said solenoid, and means for disconnecting said power means when said indicator is in its expired position.

7. Improvement according to claim 6 in which said drive means comprises a clock spring and in which said electric power means comprises a dry cell battery.

8. Improvement according to claim 6 in which said means for disengaging said clock-work mechanism comprises clutch means and in which said means for engaging said clock-work mechanism comprises spring means biasing said clutch means to the engaged position.

9. Improvement according to claim 8 in which said clutch means includes a clutch plate axially movable adjacent said clock-work mechanism and including a clutch throw-out fork pivotally mounted for axially moving said clutch plate and connected for actuation by said solenoid.

References Cited in the file of this patent

UNITED STATES PATENTS

| | | |
|---|---|---|
| 2,069,876 | Dorsett | Feb. 9, 1937 |
| 2,085,849 | Dollison et al. | July 6, 1937 |
| 2,575,650 | Alexander | Nov. 20, 1951 |
| 2,652,551 | Gumpertz et al. | Sept. 15, 1953 |
| 2,945,341 | Griffin et al. | July 19, 1960 |
| 2,983,097 | Ewing | May 9, 1961 |
| 3,018,615 | Minton et al. | Jan. 30, 1962 |